(12) United States Patent
Inoue et al.

(10) Patent No.: US 7,556,287 B2
(45) Date of Patent: Jul. 7, 2009

(54) SEAT WITH AIRBAG UNIT FOR VEHICLE

(75) Inventors: Jiyunsuke Inoue, Hiroshima (JP); Tsutomu Watanabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 189 days.

(21) Appl. No.: 11/641,078

(22) Filed: Dec. 19, 2006

(65) Prior Publication Data

US 2007/0145727 A1    Jun. 28, 2007

(30) Foreign Application Priority Data

Dec. 28, 2005   (JP)   .............................. 2005-377571
Sep. 29, 2006   (JP)   .............................. 2006-266306

(51) Int. Cl.
   B60R 21/16   (2006.01)
   B60R 21/20   (2006.01)
   B60R 21/24   (2006.01)

(52) U.S. Cl. .............. 280/730.2; 280/728.2; 280/728.3; 280/729

(58) Field of Classification Search .................. 180/271; 280/728.1, 728.2, 729, 730.1, 730.2, 735, 280/741, 728.3; 296/68.1
See application file for complete search history.

(56) References Cited

U.S. PATENT DOCUMENTS

| 5,441,299 | A | * | 8/1995 | Lauritzen et al. ......... 280/728.2 |
| 6,045,151 | A | * | 4/2000 | Wu .......................... 280/728.3 |
| 6,074,003 | A | * | 6/2000 | Umezawa et al. ........ 297/216.1 |
| 6,302,431 | B1 | * | 10/2001 | Sasaki et al. ............. 280/728.2 |
| 6,450,528 | B1 | * | 9/2002 | Suezawa et al. .......... 280/730.2 |
| 2004/0021304 | A1 | | 2/2004 | Tanase et al. |
| 2004/0075255 | A1 | * | 4/2004 | Honda et al. ............. 280/730.2 |
| 2004/0124615 | A1 | * | 7/2004 | Tanase et al. ............. 280/730.2 |
| 2004/0130127 | A1 | | 7/2004 | Kurimoto et al. |
| 2005/0161927 | A1 | * | 7/2005 | Yokoyama et al. ........ 280/743.1 |

FOREIGN PATENT DOCUMENTS

| DE | 19848905 | | 5/1999 |
| EP | 0940298 | | 9/1999 |
| EP | 0990566 | | 4/2000 |
| FR | 2867121 | | 9/2005 |
| GB | 2322603 | | 9/1998 |
| WO | WO 98/21063 | * | 7/1996 |
| WO | WO 98/21063 | | 5/1998 |
| WO | WO 99/21738 | * | 5/1999 |

OTHER PUBLICATIONS

European Seach Report, EP06026346, Date: Mar. 8, 2007.

* cited by examiner

*Primary Examiner*—Ruth Ilan
*Assistant Examiner*—James English
(74) *Attorney, Agent, or Firm*—Studebaker & Brackett PC; Donald R. Studebaker

(57) ABSTRACT

There is provided a lower space portion at a pad member of a seat back, which is positioned at a lower portion of an airbag that is folded in an airbag unit. Accordingly, an inflation of the lower portion (waist protection portion) of the airbag in the airbag unit provided at a side portion of the seat back can be improved properly.

11 Claims, 7 Drawing Sheets

SEAT WITH AIRBAG UNIT FOR VEHICLE

BACKGROUND OF THE INVENTION

The present invention relates to a seat for a vehicle that is equipped with an airbag unit at a side portion of a seat back.

Conventionally, a seat for a vehicle, for example, disclosed in U.S. Patent Application Publication Nos. 2004/0021304 A1, 2004/0124615 A1, and 2004/0130127 A1, in which an airbag unit is provided at a side portion of a seat back, and a bag member (airbag) is configured to inflate at a vehicle side crash to absorb a crash impact and thereby protect a passenger, is well known.

When the airbag unit is disposed at the side portion of the seat back, since the seat comprises a pad member and a seat skin covering the pad member, part of these pat member and seat skin that correspond to the airbag unit need to be torn or opened by an inflation pressure of the bag member so as to allow the bag member to inflate outside the seat.

Herein, in a case where the bag member is a small one having just a chest protection portion, part of the pad member and seat skin corresponding to the airbag unit may be opened promptly because the inflation pressure of the bag member is focused on this part properly, so that the bag member can inflate outside the seat properly.

Meanwhile, in a case where the bag member is configured to have a greater vertical length thereof so as to protect an entire upper body of the passenger, including the waist portion, like the bag member disclosed in the above-described patent publication, it may be rather difficult to make the bag member inflate properly at the same time over its entirely vertical length. Hereinafter, this situation will be described referring to an example. According to a certain seat, the thickness of a portion of the pad member that corresponds to a lower portion of the bag member (normally, a forward-projecting portion of the side support portion) is generally configured to be great (thick). Therefore, an inflation of the lower portion of the bag member tends to be delayed. This delay may happen to the airbag unit in which the bag member is covered by a flexible and easy-broken sheet member, such as a paper, not by a case. And, even though a port of inflatable gas from an inflator is provided at the lower portion of the bag member, the inflation of the lower portion tends to be delayed. Namely, in the case of the airbag unit in which the bag member is covered by the case, after the bag member has inflated to a certain degree in the case, the bag member goes out of the case and the increased inflation pressure of the bag member acts on the pad member and the seat skin over their entirely vertical length so as open them at the same time. In the case of the airbag unit in which the bag member is covered by the paper or the like, however, a specified portion of the bag member, which can easily inflate, for example, a relatively thin portion (a central portion or an upper portion of the bag member) tends to inflate earlier than any other portion of the bag member does. As a result, the inflation of the lower portion of the bag member is delayed.

SUMMARY OF THE INVENTION

The present invention has been devised in view of the above-described problem, and an object of the present invention is to provide a seat with airbag unit for a vehicle that can improve properly the inflation of the lower portion of the bag member.

According to the present invention, there is provided a seat with airbag unit for a vehicle, comprising a pad member forming a shape of a seat back, a seat skin covering the pad member, a bag member operative to inflate from a folded state thereof, an airbag unit that is provided at a side portion of the seat back in such a manner that at lest part thereof is covered by the pad member, wherein a lower space portion is formed at the pad member that is located below the folded bag member of the airbag unit.

Accordingly, since the lower space portion is formed at the pad member of the seat back, the lower portion of the bag member inflates into the lower space portion inside the pad member, so the inflation pressure of the lower portion of the bag member becomes sufficiently high. Thereby, for example, even though the thickness of a portion of the pad member corresponding to the lower portion of the bag member is great (thick), this portion opens substantially at the same time as other portions, a central portion and an upper portion, of the bag portion. As a result, the inflation of the lower portion of the bag member can be improved, so the bag member can inflate properly at the same time over its entirely vertical length.

According to an embodiment of the present invention, the seat skin comprises a front face portion that is located on a front-face side of the side portion of the seat back including the airbag unit, and a side face portion that is located on a side-face side of the side portion of the seat back including the airbag unit so as to be connected to the front face portion at the side portion of the seat back, there is provided a tear portion operative to be torn by an inflation pressure of the bag member, which is provided at a portion of a connection portion between the front face portion and the side face portion of the seat skin and positioned at a level of the airbag unit, and there is provided a side low-extension member operative to promote tear of the tear portion, whose one end is fixed to the tear portion and which extends from the tear portion rearward on an outside of the airbag unit, the side low-extension member having a lower extension ratio than that of the seat skin and a lower end of the side low-extension member being positioned substantially at the same level as or below a lower end of the lower space portion of the pad member.

Accordingly, since the side face portion of the seat skin is prevented from extending outward by the side low-extension member, the tear portion can be torn promptly and the bag member can inflate smoothly out of an opening of the torn portion. And, since the lower end of the side low-extension member is positioned at the same level as or below the lower end of the lower space portion, a portion of the tear portion that corresponds to the lower portion of the bag member can be broken promptly almost at the same time as other portions, the central portion and the upper portion, of the bag portion. Thus, the inflation of the lower portion of the bag member can be improved surely.

According to another embodiment of the present invention, there is provided a front low-extension member, whose one end is fixed to the tear portion and which extends from the tear portion toward a center of the seat on a front side of the airbag unit, the front low-extension member having a lower extension ratio than that of the seat skin.

Thereby, both extension of the front face portion and the side face portion of the seat skin is suppressed, the time for the tear portion being torn can be further shortened.

According to another embodiment of the present invention, at least one of the side low-extension member and the front low-extension member is disposed along the seat skin.

Herein, in the case where the low-extension member is disposed along the seat skin, it may be easier to attach the low-extension member, but the inflation of the bag member would deteriorate due to deformation of the pad member. For example, if the thickness of a portion of the pad member that corresponds to the lower portion of the bag member is small, this portion may be deformed greatly, so the inflation of the lower portion of the bag member would deteriorate. According to the present embodiment, however, since the lower space portion is formed, the portion of the pad member corresponding to the lower portion of the bag member is deformed when the inflation pressure in the lower portion of the bag member has increased properly, so the bag member can inflate properly at the same time over its entirely vertical length.

According to another embodiment of the present invention, there is provided a guide portion operative to direct the bag member toward the tear portion, which is provided at a portion of the pad member between the airbag unit and the tear portion at a level corresponding to the airbag unit.

Thereby, the inflation pressure of the bag member is focused on the tear portion, so the inflation of the bag member can be further improved.

According to another embodiment of the present invention, a lower end of the guide portion is positioned substantially at the same level as the lower end of the lower space portion.

Thereby, the inflation pressure of the bag member can be surely made act on the portion of the tear portion corresponding to the lower portion of the bag member, so the inflation of the bag member can be further improved.

According to another embodiment of the present invention, the pad member comprises a portion covering outside of the airbag unit.

Thereby, the side portion of the seat equipped with the airbag unit can be pleasant to the touch. Meanwhile, if the pad member is provided at an outside portion of the airbag unit, there is a concern that the inflation of the bag member (especially, the lower portion of the bag member that corresponds to a thick portion of the pad member) would deteriorate due to the deformation of this pad member. According to the present embodiment, however, since the lower space portion is formed, the inflation of the lower portion of the bag member would not deteriorate even though the pad member is provided at the outside portion of the airbag unit, so the bag member can inflate properly at the same time over its entirely vertical length.

According to another embodiment of the present invention, the bag member comprises a waist protection portion that corresponds to a waist portion of a passenger seated on a seat cushion, and the lower space portion is positioned substantially at the same level as the waist portion of the passenger at the seat back.

Thereby, the inflation of the waist protection portion can be improved, and the waist portion of the passenger can be surely protected in addition to the chest portion.

According to another embodiment of the present invention, the bag member comprises a waist protection portion that corresponds to a waist portion of a passenger seated on a seat cushion, a chest protection portion connected to the waist protection portion that corresponds to a chest portion of the passenger, and a partition portion that partitions the waist protection portion from the chest protection portion, and the waist protection portion is configured so that an inflation of the waist protection portion is finished before an inflation of the chest protection portion.

Thereby, the waist protection portion can inflate outside promptly. As a result, the upper body of the passenger can be pushed toward the center of the vehicle at an earlier stage, so the protection of the passenger can be further improved.

According to another embodiment of the present invention, the bag member is configured to inflate in such a manner that a lower face of the bag member contacts an upper face of a seat cushion.

It is preferable from the protection improvement of the passenger that the bag member be provided to extend downward as much as possible. For example, the bag member preferably extends downward so as to interfere with the upper face of the seat cushion in order to push the passenger toward the center of the vehicle by the waist protection portion like the above-described embodiment. However, this extension downward of the bag member may let the bag member inflate contacting the upper face of the seat cushion. Herein, if the above lower space portion was not formed at the pad member, the lower portion of the bag member would not be restricted by both the seat cushion and the seat back during, so the inflation operation of the lower portion of the bag member would become unstable improperly. According to the present embodiment, however, since the lower space portion is formed, the lower portion of the bag member can be maintained in substantially free condition without any restriction of the seat back. Thereby, the lower portion of the bag member can inflate forward smoothly without receiving a large reaction from the upper face of the seat cushion even if the bag member contacts the upper face of the seat cushion. As a result, the stable inflation of the bag member over its entirely vertical length can be attained.

According to another embodiment of the present invention, there is provided a side support portion at the side portion of the seat back so as to project forward and extend vertically, a front end of the side support portion is formed in a curve shape so that a central portion thereof projects greatly from a rear end of a seatback frame than an upper and lower end portions thereof do, when viewed from the side, and the lower space portion is located near a portion where a distance between the front end of the side support portion and the rear end of the seat back frame has the greatest distance.

Generally, the portion of the side support portion where the distance between the front end of the side support portion and the rear end of the seat back frame has the greatest distance, which may correspond to the waist portion of the passenger seated on the seat cushion, has a considerably thick pad member thereat to provided a proper holding of the passenger in the seat. Therefore, this portion may provide a concern of a poor inflation of the bag member. According to the present embodiment, since the lower space portion is formed at or near the above-described portion, the proper inflation of the bag member can be ensured, and thereby especially the waist of the passenger can be surely protected.

According to another embodiment of the present invention, the bag member in the folded state in the airbag unit is covered by a paper operative to be broken by an inflation pressure of the bag member.

Thereby, the structure can be made simple and inexpensive compared to the airbag unit in which the bag member is covered in a case. Meanwhile, in the airbag unit with the bag member covered by the paper, the bag member may inflate out of the portion corresponding to the central or upper portions where the thickness of the pad member is the greatest, so that the inflation of the lower portion of the bag portion may deteriorate. According to the present embodiment, however, since the lower space portion is formed, the bag member can inflate out of the portion of the thick pad portion corresponding to the lower portion of the bag member substantially at the same time as other portions. Thus, the proper inflation of the bag member can be ensured even if the bag member is covered by the paper, and thereby the waist of the passenger can be surely protected in the case where the waist protection portion is provided like the above embodiments.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
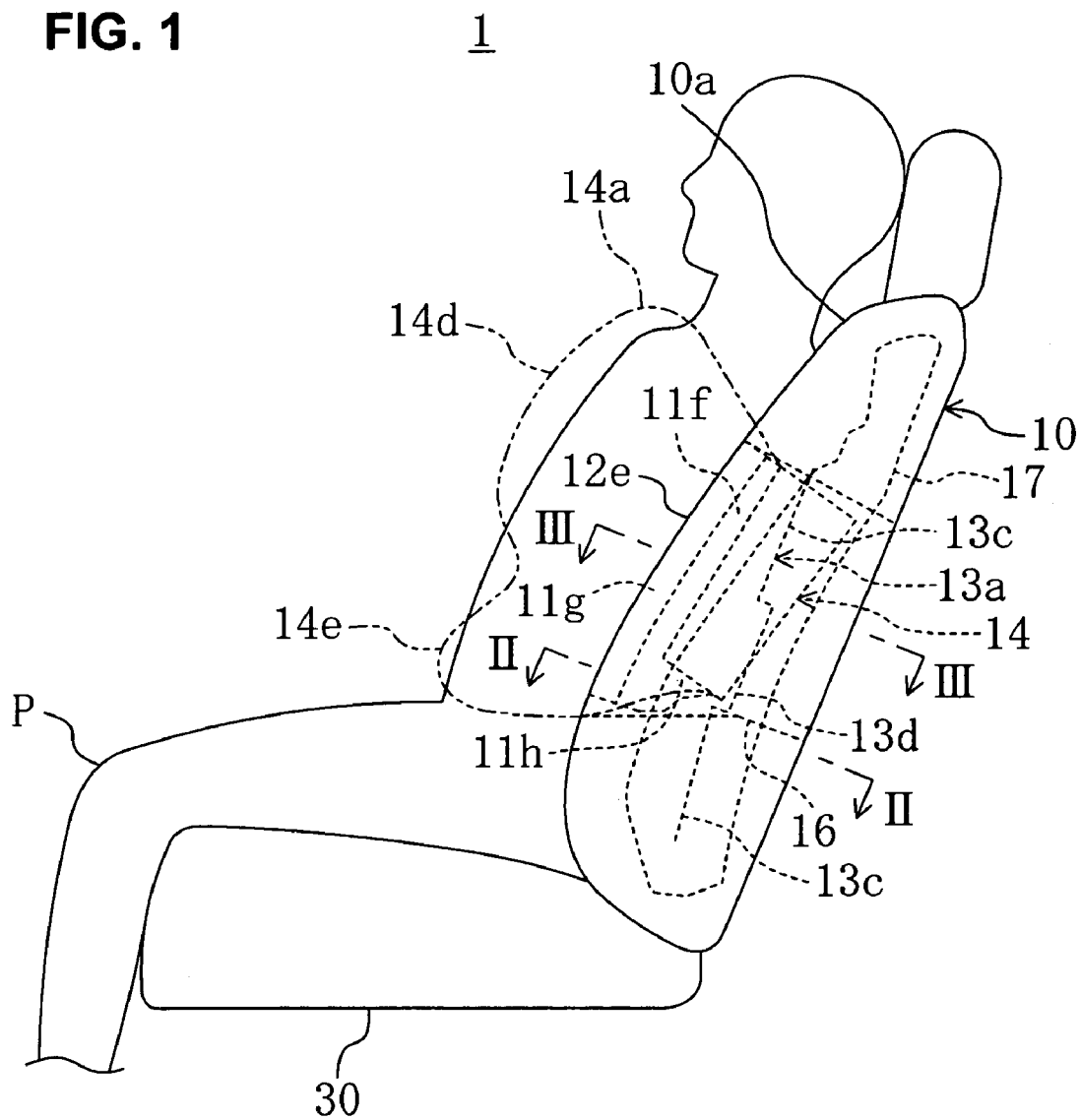
FIG. 1 is a side view of a seat for a vehicle according to a fist embodiment of the present invention.
Figure 2:
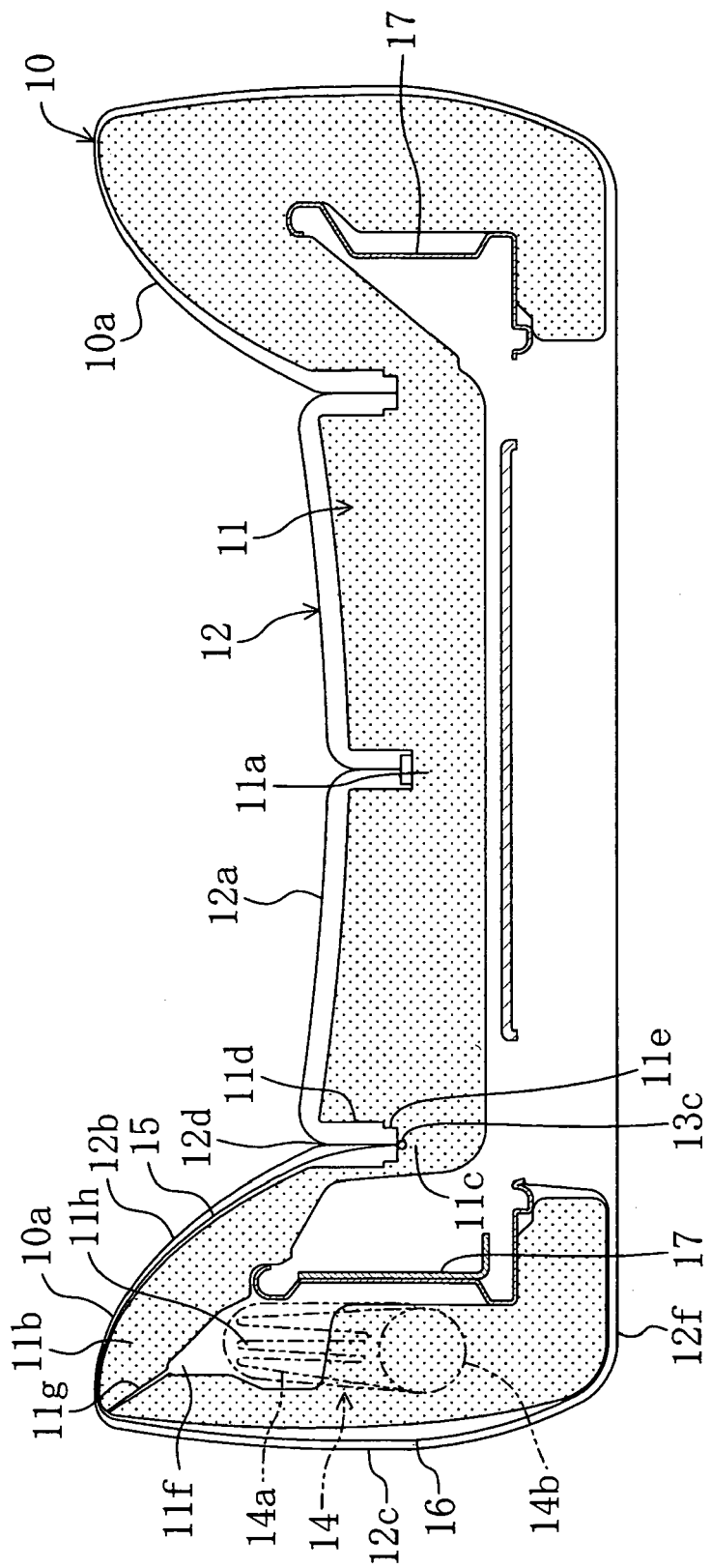
FIG. 2 is a sectional view of the seat taken along line II-II of FIG. 1.
Figure 3:
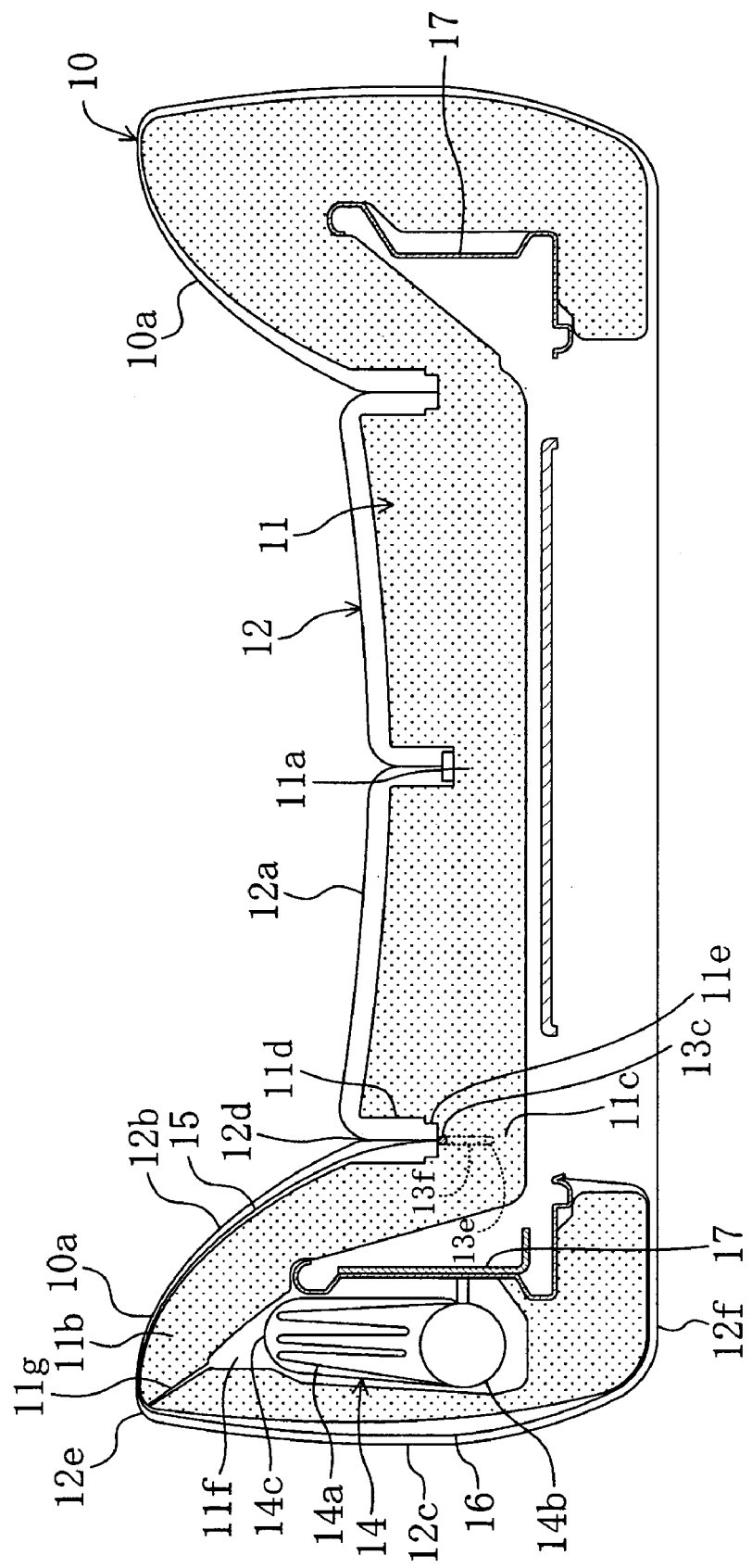
FIG. 3 is a sectional view of the seat taken along line III-III of FIG. 1.
Figure 4:
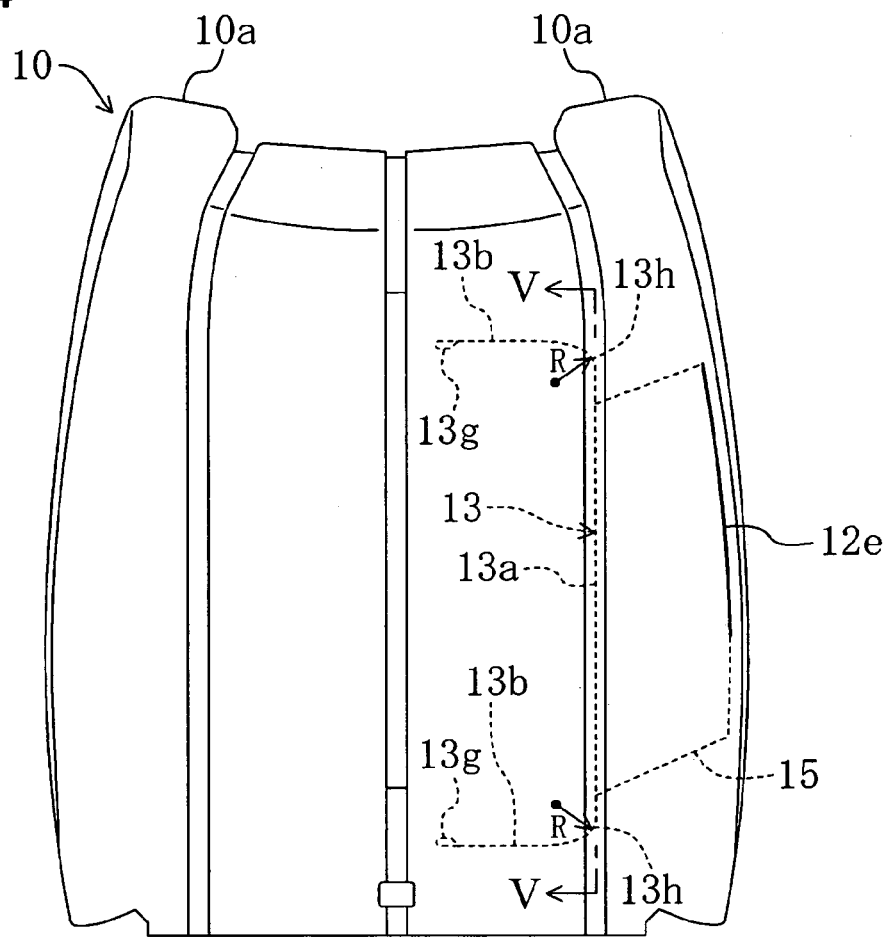
FIG. 4 is an elevation view of a seat back of the seat of a vehicle.
Figure 5:
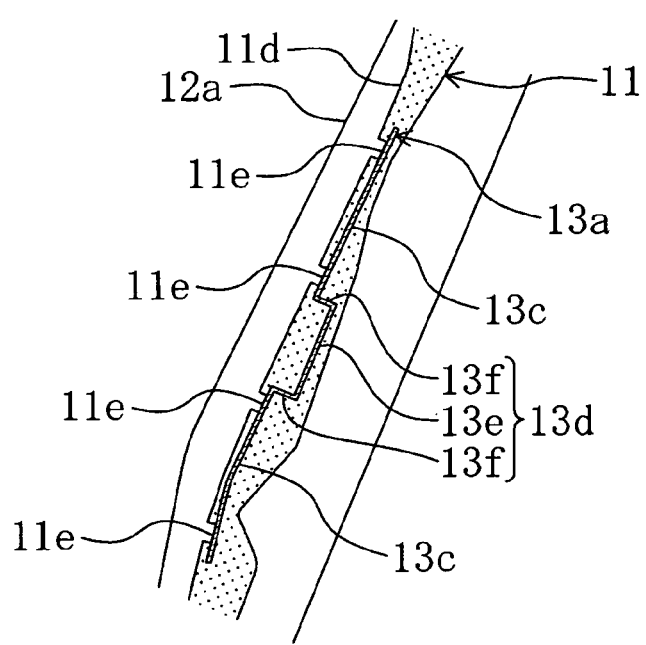
FIG. 5 is a sectional view of the seat back taken along line V-V of FIG. 4.
Figure 6:
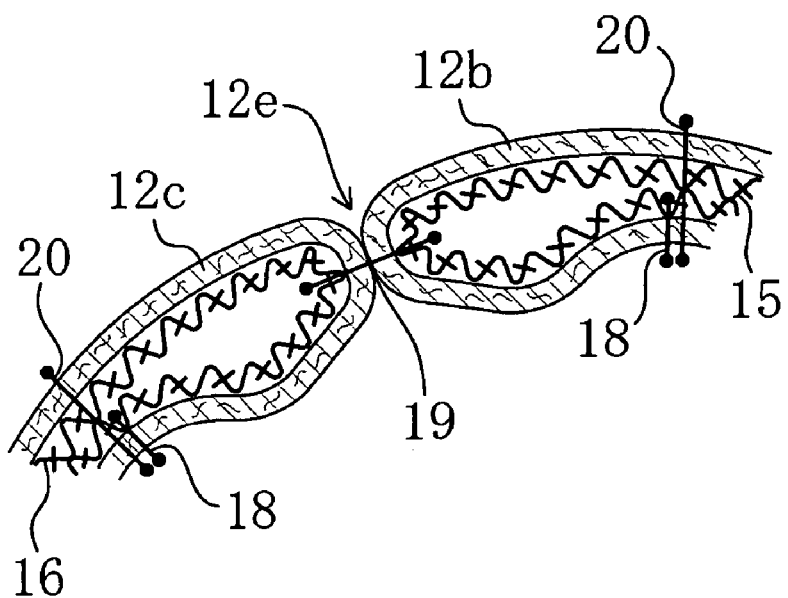
FIG. 6 is an enlarged view of a seat skin of FIG. 3 around a tear portion.
Figure 7:
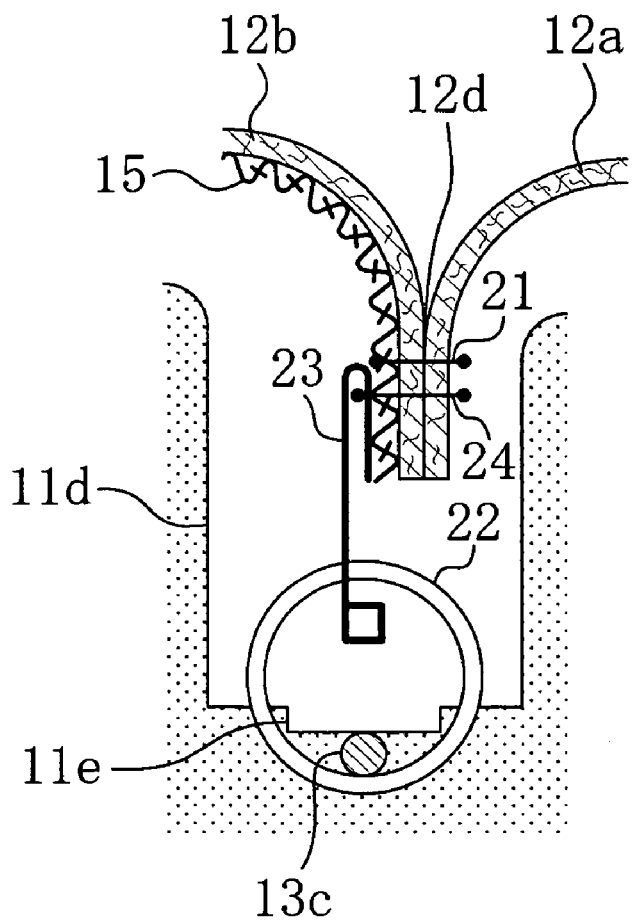
FIG. 7 is an enlarged view of a pad portion of FIG. 3 around a groove portion.

FIG. 1 is a side view of a seat for a vehicle according to a fist embodiment of the present invention. FIG. 2 is a sectional view of the seat taken along line II-II of FIG. 1. FIG. 3 is a sectional view of the seat taken along line III-III of FIG. 1. FIG. 4 is an elevation view of a seat back of the seat of a vehicle. FIG. 5 is a sectional view of the seat back taken along line V-V of FIG. 4. FIG. 6 is an enlarged view of a seat skin of FIG. 3 around a tear portion. FIG. 7 is an enlarged view of a pad portion of FIG. 3 around a groove portion.

According to the seat for a vehicle of a first embodiment of the present invention, a vehicle seat is disposed on a floor panel of the vehicle so that a lateral direction of the seat corresponds to a vehicle width direction. Hereinafter, an assistant seat will be described as the vehicle seat of the present invention. Herein, other seats have substantially the same structure as the assistant seat.

As shown in FIGS. 1-5, an assistant seat 1 comprises a seat back 10 and a seat cushion 30. The seat cushion 10 is pivotally supported at a rear end portion of the seat cushion 30 via a knuckle member, not illustrated, so that it can rotate around an axis extending in a seat width direction with an adjustable angle with respect to the seat cushion 30. At both sides of the seat back 10 are respectively provided seatback frames 17, 17 that extend vertically and longitudinally. Herein, a left-side seatback frame 17 is comprised of two plates.

The seatback 10 has at its both sides a pair of side support portions 10a, 10a that projects forward (toward the front of vehicle) from a center back face of the seat and extends vertically. A front end of each side support portion 10a is formed in a curve shape so that its central portion projects greatly from a rear end of the seatback frame 17 than its upper and lower end portions do, when viewed from the side. For example, a portion of the front end of the side support portion 10a that is positioned at about a ¼ level from a lower end of the seat back 10 has the greatest projection from the rear end of the seatback frame 17. Further, the side support portion 10a is formed in a curve face shape so that a projection from the back face is greater toward the outside (see FIGS. 2 and 3).

The seat back 10 comprises a pad member 11 to form a seatback shape, a seat skin 12 to cover the pad member 11, an insert wire 13, and an airbag (bag member) 14a operative to inflate from its folded state, and is equipped with a side airbag unit 14 that is provided at its left-side portion (at its vehicle-outside portion).

The pad member 11 is made of sponge having a relatively hard rigidity. A groove portion 11d is formed on a front side of the pad member 11 at a boundary portion 11c located between a central portion 11a and a left-side portion 11b so as to extend vertically. Accordingly, the thickness of the boundary portion 11c is smaller than any other portions of the pad member 11. At a bottom portion of this groove portion 11d is formed four recess portions 11e that are disposed at intervals of a specified length in a vertical direction (see FIG. 5). A first buried member 13c of a vertical buried portion 13a of the insert wire 13, which will be described below, exposes at these portions of the recess portions 11e, so that the insert wire 13 buried in the pad member 11 can be recognized. Herein, the front face of the pad member 11 contains a side face and a bottom face of the groove portion 11d of the pad member 11.

Herein, the pad member 11 is made by a foaming process. Since the thickness of the boundary portion 11c is smaller than any other portions of the pad member 11 as described above, the foaming process for this portion 11c will be finished earlier than any other portion. Accordingly, the density, thereby the rigidity of the boundary portion 11c is greater than that of any other portions.

The seat skin 12 is comprised of a plurality of parts that cover the pad member 11. Namely, the seat skin 12 comprises a central front face portion 12a, an outside front face portion 12b, and a side face portion 12c. Herein, a left-side edge portion of the central front face portion 12a is fixed (connected) to the vertical buried portion 13a of the insert wire 13, and the central front face portion 12a covers the front face of the central portion 11a of the pad member 11. A right-side edge portion of the outside front face portion 12b is fixed to the vertical buried portion 13a of the insert wire 13, and the outside front face portion 12b covers the front face of the left-side portion 11b of the pad member 11. A front-side edge portion of the side face portion 12c is connected to the left-side edge portion of the outside front face portion 12b, and the side face portion 12c covers the side face of the left-side portion 11b of the pad member 11. The outside front face portion 12b, which extends toward the outside from the vertical buried portion 13a of the insert wire 13, corresponds to a front face portion of the side portion of the seat back 10, at which the side airbag unit 14 that is provided. Meanwhile, the side face portion 12c, which extends rearward from its connection portion with the outside front face portion 12b, corresponds to a side face portion of the side portion of the seat back 10, at which the side airbag unit 14 that is provided and which is connected to the above-described front face portion (outside front face portion 12b) of the side portion of the seat back 10.

The boundary portion of the seat skin 12 between the central front face portion 12a and the outside front face portion 12b forms a recess portion 12d that is recessed backward.

A tear portion 12e is provided so as to extend vertically at a portion of the connection portion between the outside front face portion 12b and the side face portion 12c of the seat skin 12 that is positioned at a level of the side airbag unit 14. This tear portion 12e is configured to be torn by an inflation pressure of the airbag 14a so that the airbag 14a can go out of this torn portion when the airbag 14a of the side airbag unit 14 is inflated. Namely, a strength of a thread at the tear portion 12e, with which the outside front face portion 12b and the side face portion 12c are sewed, is set to be weaker than that of a thread at other portions, so the tear portion 12e can be torn easily and properly.

There is provided a front low-extension member 15 between the front face of the left-side portion 11b of the pad member 11 and the outside front face portion 12b of the seat skin 12 so as to extend along these. The front low-extension member 15, which is made of clothes operative to promote the tear of the tear portion 12e at the inflation of the airbag 14a, has a lower extension ratio than that of the seat skin 12. Namely, the front low-extension member 15 does not extend so much as the seat skin 12. A left-side edge portion of the front low-extension member 15 is fixed to the tear portion 12e, and the front low-extension member 15 extends from the tear portion 12e toward the center of the seat passing through the front of the side airbag unit 14. A right-side edge portion of the front low-extension member 15 is fixed to the vertical buried portion 13a of the insert wire 13.

There is also provided a side low-extension member 16 between the side and rear faces of the left-side portion 11b of the pad member 11 and the side and rear faces 12c, 12f of the seat skin 12 so as to extend along these. The side low-extension member 16, which is also made of clothes operative to promote the tear of the tear portion 12e at the inflation of the airbag 14a, has a lower extension ratio than that of the seat skin 12 like front low-extension member 15. A front-side edge portion of the side low-extension member 16 is fixed to the tear portion 12e, and the side low-extension member 16 extends from the tear portion 12e rearward of the seat passing through the outside of the side airbag unit 14. A rear-side edge portion of the side low-extension member 16 extends toward the center of the seat and is fixed to a rear portion of the seat back fame 17 that is located in back of the side airbag unit 14.

Upper ends of the front low-extension member 15 and the side low-extension member 16 are positioned at the same level as or above an upper end of a space portion for airbag inflation 11f which will be described below. Meanwhile, lower ends of the front low-extension member 15 and the side low-extension member 16 are positioned at the same level as or below a lower end (the same level as a lower end of the space portion for airbag inflation 11f) of a lower space portion 11h which will be described below.

Hereinafter, a forming process of the tear portion 12e of the seat skin 12 will be described briefly referring to FIG. 6. First, the outside front face portion 12b of the seat skin 12 and the front low-extension member 15 are overlapped, and then their left-side edges are sewed with a first thread 18 to form a sewing portion. Also, the side face portion 12c of the seat skin 12 and the side low-extension member 16 are overlapped, and then their front-side edges are sewed with the first thread 18 to form a sewing portion. Then, both sewing portions are sewed with a second thread 19. After this, the respective portions 12b, 12c are turned up in such a manner that respective sewing portions are located inside, and then turned-up portions are sewed with a third thread respectively. Accordingly, the tear portion 12e is formed at the connection portion between the outside front face portion 12b and the side face portion 12c of the seat skin 12. Thus, no pace between the both portions 12b, 12c is formed by the second thread 19 in a normal state, however, when the airbag 14a is inflated, the second thread 19 is broken (torn) by the inflation pressure of the airbag, so an opening between the both portions 12b, 12c of the seat skin 12 is formed and the airbag 14a gets out of this opening for inflation outside the seat back 10. Herein, the above-described sewing of the turned-up portion with the third thread 20 may be omitted.

As shown in FIGS. 1-5, the above-described insert wire 13 comprises the vertical buried portion 13a and upper and lower horizontal buried portions 13b, 13b.

The vertical buried portion 13a is buried so as to extend vertically, when viewed from the front, from the upper end portion to the lower end portion of the pad member 11 at the boundary portion 11c located between the central portion 11a and the left-side portion 11b of the pad member 11. The upper end of the vertical buried portion 13a is positioned above the upper end of the tear portion 12e, and the lower end of the vertical buried portion 13a is positioned below the lower end of the tear portion 12e. Also, the vertical buried portion 13a is formed, like the front end of each side support portion 10a, in a curve shape when viewed from the side, and comprises upper and lower first buried portions 13c, 13c that are buried respectively at a bottom portion (front face side) of the groove portion 11d of the boundary portion 11c, and a second buried portion 13d that is buried at the boundary portion 11d in such a manner that a distance between the second buried portion 13d and a bottom face (front face of the pad member 11) of the groove portion 11d is greater than that between the first buried portion 13c and the bottom face of the groove portion 11d. Herein, the upper end of the vertical buried portion 13a may be positioned substantially at the same level as the upper end of the tear portion 12e, and the lower end of the vertical buried portion 13a may be positioned substantially at the same level as the lower end of the tear portion 12e.

To the first buried portions 13c are fixed the left-side edge portion of the central front face portion 12a and the right-side edge portion of the outside front face portion 12b of the seat skin 12, and the right-side edge portion of the front low-extension member 15. For example, each first buried portion 13c may have a length of 100 mm or more, when viewed from the front. In the present embodiment, its length is set to be 170 mm.

The second buried portion 13d is disposed at a central portion of the vertical buried portion 13a and behind the lower first buried portion 13c. The second buried portion 13d is located near a specified portion of the left-side side support portion 10a, in which the distance between the front end of the side support portion 10a and the rear end of the seat back frame 17 is the greatest. The second buried portion 13d comprises a vertical portion 13e extending vertically, and upper and lower bent portions 13f, 13f interconnecting the first buried portion 13c and the vertical portion 13e respectively. The length of the vertical portion 13e may be 50 to 80 mm, when viewed from the front, and it is set to be 50 mm in the present embodiment. The length of the upper bent portion 13f may be 10 to 20 mm, and it is set to be 10 mm in the present embodiment. The length of the lower bent portion 13f may be 15 to 30 mm, and it is set to be 15 mm in the present embodiment. It is preferable that these bent portions 13f, 13f have a longer length.

The upper and lower horizontal buried portions 13b, 13b are disposed so as to extend from the both ends of the vertical buried portion 13a toward the center of the seat and be buried in the central portion 11a of the pad member 11. The upper horizontal buried portion 13b is located above the upper end of the tear portion 12e. The lower horizontal buried portion 13b is located below the lower end of the tear portion 12e. A tip of each horizontal buried portion 13b is bent so as to be turned up and form a turned-up portion 13g. Each horizontal buried portion 13b extends to a portion near the center of the seat back 10 (pad member 11). The length of the horizontal buried portion 13b may be 50 mm or more, and it is set to be 300 mm in the present embodiment.

Upper and lower bent portions 13h, 13h at boundary portions between the vertical buried portion 13a and the both horizontal buried portions 13b, 13b are formed in an arc shape with a curvature radius of 15 to 200 mm, respectively. Herein, the curvature radius is measured for a center axis of the insert wire 13. It is preferable that the curvature radius be 200 mm or less. Because, if it is more than 200 mm, it may be difficult to maintain a specified shape of the insert wire 13 in the seat back 10 properly or the length of the vertical buried portion 13a may be shorter than a desirable length.

A forming process of the insert wire 13 will be briefly described. Upper and lower ends of a single wire are bent, whereby the upper and lower horizontal buried portions 13b, 13b are formed. Then, a center portion of the wire is bent to project rearward, whereby the second buried portion 13d is formed. Thus, the insert wire 13 is formed. The insert wire 13 is buried in the pad member 11 at the foaming process of the pad member 11.

A forming process of the pad member 11 with foaming will be briefly described. At first, a mold is provided in such a manner that a side thereof for forming a front face of the pad member 11 is located below. Then, the insert wire 13 is disposed in a specified position within the mold. After this, a material containing a foaming agent is supplied into the mold and the foaming is conducted. Thus, the pad member is formed. Herein, since the thickness of the boundary portion 11c of the pad member 11 is smaller than that of any other portions as described above, this boundary portion 11c may be maintained for a preferably long period in a sate with the foaming agent filled therein in the forming.

Further, a process of fixing the seat skin 12 and the front low-extension member 15 to the insert wire 13, covering the pad member 11 by the sewed seat skin 12 and the front low-extension member 15 will be briefly described referring to FIG. 7. First, the left-side edge portion of the central front face portion 12a of the seat skin 12, the right-side edge portion of the outside front face portion 12b of the seat skin 12, and the right-side edge portion of the front low-extension member 15 are sewed with a first thread 21 to form a sewing portion. Then, respective portions of this sewing portion that correspond to the respective recess portions 11e are attached to plastic pins 23 with second threads 24. Then, the plastic pins 23 are fixed to respective portions of the upper and lower first buried portions 13c, 13c of the insert wire 13 that correspond to the respective recess portions 11e via O-rings (hook rings), whereby the pad member 11 is covered by the seat skin 12 and the front low-extension member 15. Thus, the central front face portion 12a, the outside front face portion 12b, and the front low-extension member 15 are fixed to the insert wire 13 via the O-rings 22.

The side airbag unit 14 is provided to protect a passenger P seated on the seat cushion 30 of the assistant seat 1 at a vehicle side crash as shown in FIGS. 1 and 3. The side airbag unit 14 is disposed at a central portion and outside the insert wire 13 in the left-side portion 11b of the pad member 11 (namely, in the left-side side support 10a of the seat back 10). And, respective front, rear, outside, upper and lower sides of the side airbag unit 14 are covered by the pad member 11. The side airbag unit 14 contains the airbag 14a in the folded state and an inflator 14b that is fixed to the seat back frame 17 and supplies inflatable gas to the airbag 14a. The airbag 14a in the folded state is disposed before the inflator at the normal state (at an non-inflation state) and covered by a paper 14 that is broken by the inflation pressure of the airbag 14a. Thus, the folded-state airbag 14a is maintained. The covering of the airbag 14a with the paper 14c can provide a simple and inexpensive structure compared to a disposition of the airbag in the case. According to the present embodiment, a gas supply port for the gas supplied to the airbag 14a is formed at a portion of the inflator 14b that is located at a lower position and a waist protection portion 14e, which will be described below.

The airbag 14a is inflated from its folded state by the gas supplied from the inflator 14b at the vehicle side crash. Herein, an opening portion 11g of the pad member 11, which will be described below, is enforced to open, and the tear portion 12e is torn by the inflation pressure of the airbag 14a, so the airbag 14a goes out of the seat back 10 and inflates outside. Thereby, the chest or waist portions of the passenger P seated on the seat cushion 30 can be protected. Namely, the airbag 14a inflating outside the seat back 10 comprises a chest protection portion 14b and a waist protection portion 14e. Thus, the airbag 14a equipped with these chest protection portion 14b and the waist protection portion 14e inflates at the vehicle side crash in such a manner that these protection portions are properly located between the passenger's chest and waist and a vehicle side wall portion (not illustrated), thereby protecting the passenger P.

The opening portion 11g, which is opened by the inflation pressure of the airbag 14a, and the space portion for airbag inflation 11f, which is located between the side airbag unit 14 and the opening portion 11g for allowing the airbag 14a to open therein, are formed at a portion of the left-side portion 11b of the pad member 11 that is located before and at the same level as the airbag unit 14.

The above-described opening portion 11g of the present embodiment is formed of a slit that is made by cutting part of the above portion of the left-side portion 11b of the pad member 11 located before the airbag unit 14 from its seat inner face to its seat outer face (this slit is illustrated with a gap in FIG. 3, an actually-materialized slit may have substantially no gap).

Herein, the space portion for airbag inflation 11f is configured so that its width becomes gradually smaller toward the opening portion 11g form the side airbag unit 14. Thereby, the airbag 14a inflating is properly guided toward the opening portion 11g, and the guided airbag 14a is further guided by the opening portion 11g toward the tear portion 12e. Namely, the space portion for airbag inflation 11f and opening portion 11g function as a guide portion for properly directing the airbag 14a toward the tear portion 12e.

Upper ends of the space portion for airbag inflation 11f and opening portion 11g are positioned at substantially the same level, and located at the same level as or above the upper end of the airbag 14a in the folded state. Meanwhile, lower ends of the space portion for airbag inflation 11f and opening portion 11g are positioned at substantially the same level, and located below the lower end of the airbag 14a in the folded state, specifically at substantially the same level as a lower end of the lower space portion 11h, which will be described below. Herein, the upper and lower ends of the tear portion 12e are respectively located at substantially the same level as the upper and lower ends of the space portion for airbag inflation 11f.

The lower space portion 11h is formed below the folded airbag 14a of the side airbag unit 14 at the left-side portion 11b of the pad member 11. The lower space portion 11h connects with the space portion for airbag inflation 11*f* on the front side of the seat. And, the lower space portion 11*h* in the seat back 10 is positioned at substantially the same level of the waist portion of the passenger P on the seat cushion 30, for example, at a level that is 15 to 30 cm high from a sitting face of the passenger P seated on the seat cushion 30 when supposing the passenger P having an average body size of an American male adult. This height position is a portion where a distance between the front end of the side support portion 10*a* and the rear end of the seat back frame 17, when viewed from the side, is the greatest. Thereby, the lower space portion 11*h* is located near the above-described portion where the greatest distance is provided.

Hereinafter, operations of the side airbag unit 14 will be described.

When the vehicle side crash is detected by a crash detecting sensor, not illustrated (acceleration sensor or the like), the inflator 14*b* generates the inflatable gas. The gas is supplied to the airbag 14*a* via the gas supply port of the inflator 14*b*. Thereby, the airbag 14*a* breaks the paper 14*c* with the gas pressure from the inflator 14*b* and inflates into the space portion for airbag inflation 11*f*. The opening portion 11*g* is opened by the inflation pressure of the airbag 14*a* so that the airbag 14 can inflate and the tear portion 12*e* can be torn. As a result, the airbag 14 inflates outside the seat bag 10. Herein, the waist protection portion 14*e* is generally difficult to be inflated compared to the chest protection portion 14*d*, because the waist protection portion 14*e* needs to open a rather thick portion of the pad member 11 for inflation. Accordingly, if there was not provided the lower space portion 11*h*, the inflation of the waist protection portion 14*e* outside the seat back 10 would be delayed improperly. This delay would be larger in the case where the side airbag unit 14 is cover by the paper 14*c* like the present embodiment. According to the present embodiment, however, the lower space portion 11*h* is provided, so the waist protection portion 14*e* is inflated in the lower space portion 11*h* in the left-side portion 11*b* of the pad member 11, and thereby the inflation pressure of the waist protection portion 14*e* increases greatly enough to open a portion of the opening portion 11*g* to be opened by the waist protection portion 14*e* substantially at the same time as a timing of opening a portion of the opening portion 11*g* to be opened by the chest protection portion 14*d*. As a result, the tear portion 12*e* is torn entirely vertically at the same time, and the chest protection portion 14*d* and the waist protection portion 14*e* go out and inflate outside substantially at the same time over its entirely vertical length, thereby protecting the chest and waist portions of the passenger P surely and properly.

Also, the outside front face portion 12*b* and the side face portion 12*c* of the seat skin 12 is prevented from extending outward by the front low-extension member 15 and the side low-extension member 16. Thereby, the tear portion 12*e* can be torn promptly by the inflation pressure of the airbag 14*a*. And, the lower ends of the front low-extension member 15 and the side low-extension member 16 are positioned at the same level as or below the lower ends of the lower space portion 11*h*. Thereby, the portion of the tear portion 12*e* that corresponds to the waist protection portion 14*e* can be broken almost at the same time as the portion corresponding to the chest protection portion 14*d*. Thus, the inflation of the waist protection portion 14*e* can be improved surely.

Embodiment 2

Figure 8:
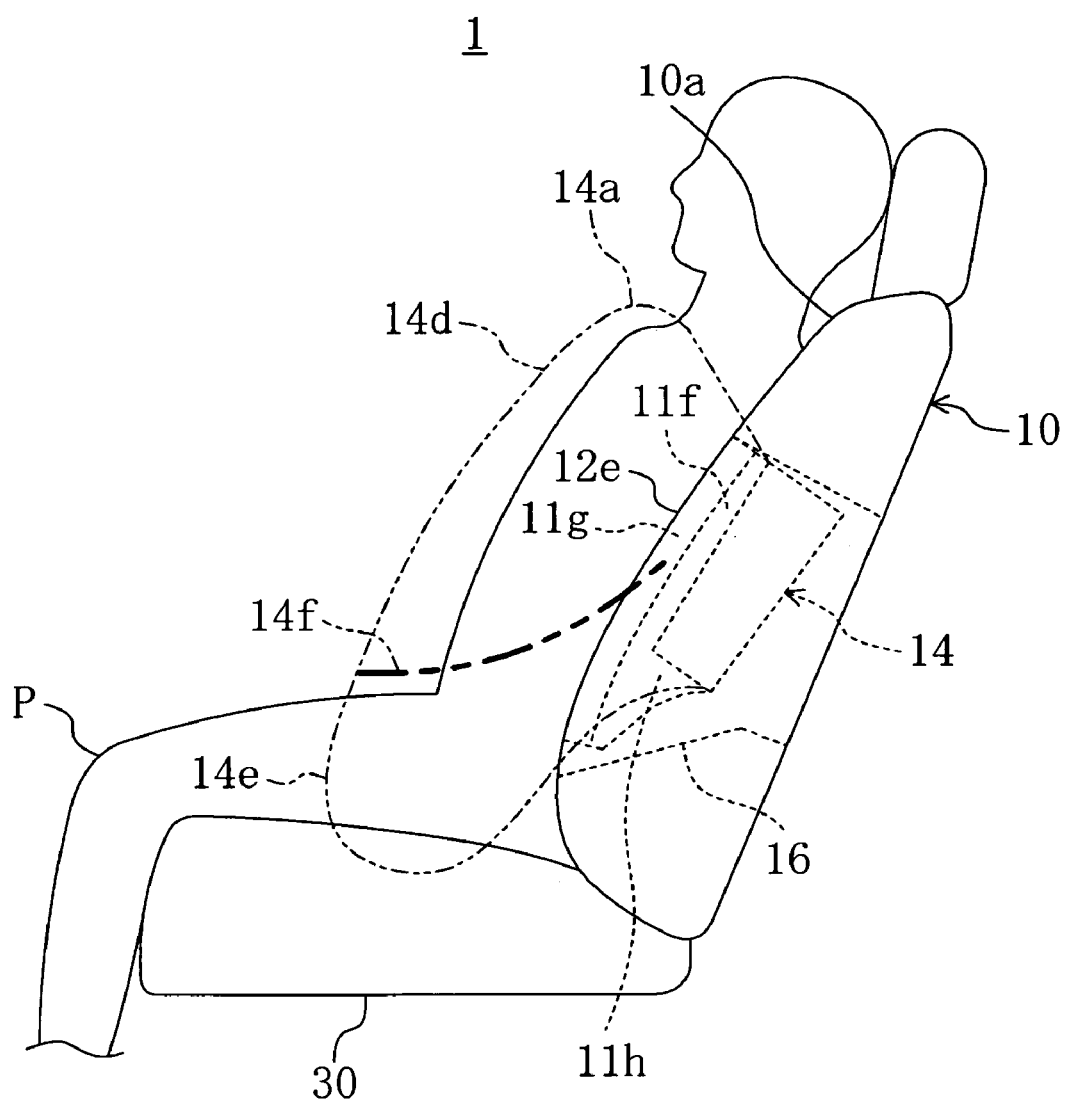
FIG. 8 is a side view of a seat for a vehicle according to a second embodiment of the present invention, which corresponds to FIG. 1.
Figure 9:
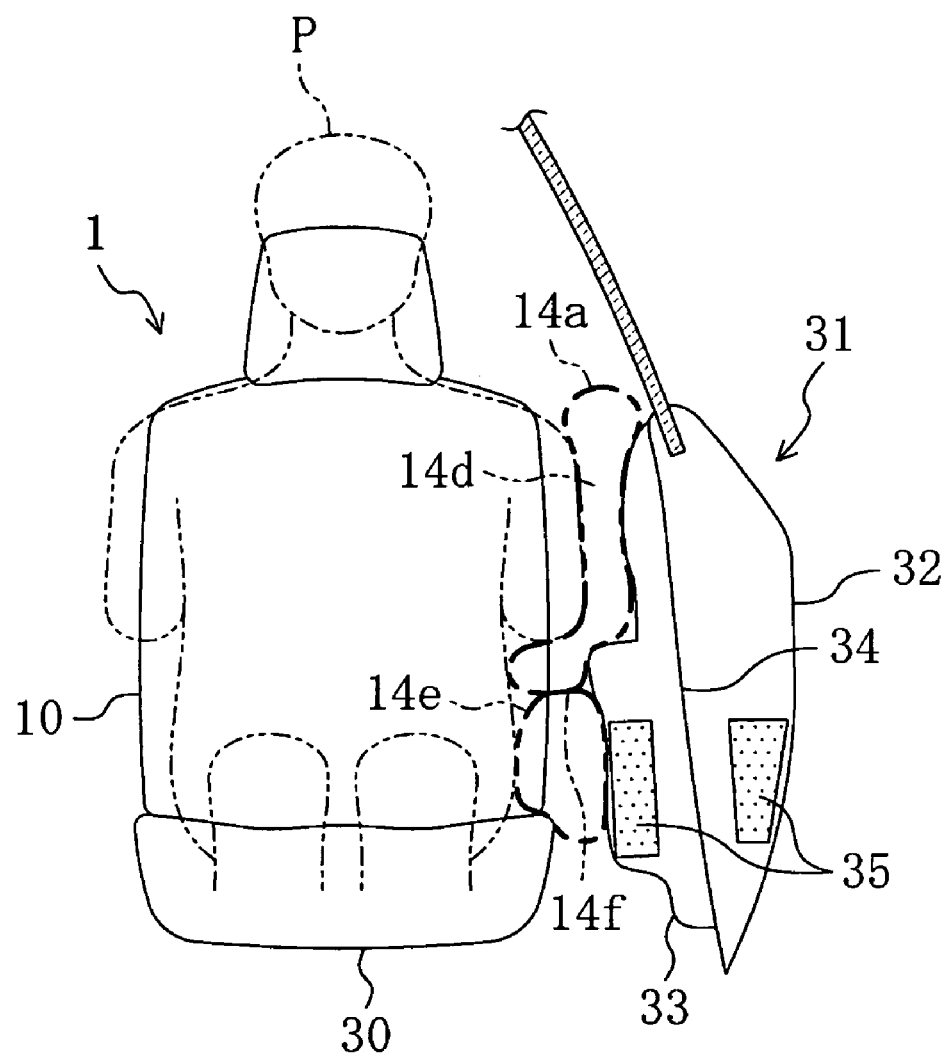
FIG. 9 is a sectional view of a major portion of a vehicle taken along a line extending in a vehicle width direction which is located before an assistant seat.

FIGS. 8 and 9 show a second embodiment of the present invention (the same components as those in FIG. 1 has the same reference characters, whose descriptions are omitted), in which the structure and the size (shape) of the airbag 14*a* are different from those of the first embodiment. The structures of the side airbag unit 14 and the assistant seat 1 except the airbag 14*a* are the same as those of the first embodiment.

Namely, the inflated airbag 14*a* of the present embodiment comprises the waist protection portion 14*e* corresponding to the waist portion of the passenger P seated on the seat cushion 30, the chest protection portion 14*d* corresponding to the chest portion of the passenger P (including a stomach portion in the present embodiment), and a partition portion 14*f* partitioning the waist protection portion 14*e* from the chest protection portion 14*d*. The partition portion 14*f* is formed by sewing both clothes constituting lateral both-side faces of the airbag 14*a* (passenger side and opposite side) and located at a separation portion between the chest protection portion 14*d* and the waist protection portion 14*e*. No partition portion is provided at the airbag 14*a* near the inflator 14*b*, and both protection portions 14*d*, 14*e* are connected to each other.

A gas supply port of the inflator 14*b* is provided at the waist protection portion 14*e*, and the gas from the inflator 14*b* is supplied to the waist protection portion 14*e*. Part of the gas supplied to the waist protection portion 14*e* is supplied to the chest protection portion 14*d* via a portion without the above-described partition portion 14*f*. Thus, the inflation of the waist protection portion 14*e* is finished before the inflation of the chest protection portion 14*d*. Accordingly, the body of the passenger P is pushed toward the center of the vehicle by the chest protection portion 14*d* at an early stage of the vehicle side crash.

According to the present embodiment, the airbag 14*a* has a vertical length that may interfere with the seat cushion 30 when it inflates. Namely, as shown in FIG. 9, the airbag 14*a* is configured to inflate in such a manner that a passenger-side portion of the lower face of the airbag 14*a* (waist protection portion 14*e*) contacts an outside end portion of the upper face of the seat cushion 30 (the side support portion may be formed at this end portion). Thereby, the pushing of the passenger P toward the center of the vehicle by the waist protection portion 14*e* can be attained surely. Herein, each position of the lower ends of the side low-extension member 16, space portion for airbag 11*f*, lower space portion 11*n*, and tear portion 12*e* is changed to a lower position than each position of those of the first embodiment.

A side door 31 (a side door near the assistant seat 1 shown in FIG. 9) of the present embodiment has two pressing pads 35, 35 therein that are made of urethane or the like. Namely, the side door 31 comprises an outer panel 32, inner panel 33 and reinforcement 34, and the pressing pads 35 are disposed respectively between the outer panel 32 and the reinforcement 34 and between the inner panel 33 and the reinforcement 34. The pressing pads 35 are located substantially at the same level as the waist protection portion 14*e* of the airbag 14*a* in the inflation state so as to press the waist protection portion 14*e* toward the center of the vehicle, absorbing a crash impact when another vehicle or something hit the side door 31. Thereby, the passenger P can be pushed toward the center of the vehicle more surely along with the above-described early inflation of the waist protection portion 14*e*. Herein, it may not be indispensable to provide the pressing pad 35, and the pushing of the passenger P may be attained only by the inflation of the waist protection portion 14*e*.

According to the present embodiment, since the passenger P is pushed toward the center of the vehicle by the waist protection portion 14*e*, the protection of the passenger P can be further improved. Meanwhile, this structure may make the vertical length of the airbag 14*a* longer, so the airbag 14*a* may inflate contacting the upper face of the seat cushion 30. Herein, if there was not provided the lower space portion 11h at the pad member 11, the lower portion (waist protection portion 14e) of the airbag 14a under inflation would be restricted by both the seat cushion 30 and the seat back 10, so there is a concern that the inflation of the lower portion of the airbag 14a would become unstable. According to the present embodiment, however, since the lower space portion 11h is provided like the embodiment 1, the above-described restriction of the lower portion of the airbag by the seat back 10 is prevented and the flexibility in an inflation direction can be enhanced. Thus, even if the lower portion of the airbag 14a contacts the upper face of the seat cushion 30, the reaction force from the upper face is reduced, so that the airbag can inflate forward smoothly sliding on the upper face of the seat cushion 30. Thereby, the stable and proper inflation of the airbag 14a in the vertical direction can be attained, and the whole part of the passenger P from the waist portion to the chest portion can be properly protected.

Also, since the partition portion 14f extending substantially longitudinally in its inflation state is provided at the airbag 14a, the airbag 14a may be easily bent at this partition portion 14f in substantially a L shape, when viewed from the front. Thus, even if the lower portion of the airbag 14a contacts the upper face of the seat cushion 30, the reaction force from the upper face is reduced, so that the airbag can be inflated more smoothly.

Herein, although the chest protection portion 14d and the waist protection portion 14e are separated by the partition portion 14f in the second embodiment, this partition portion 14f may not be indispensable. The airbag 14a without the partition portion 14f is also applicable like the first embodiment. Also, it may be preferable regardless of providing the partition portion 14f that the waist protection portion 14e be inflated earlier to push the passenger P toward the center of the vehicle with the waist protection portion 14e. However, the earlier inflation of the waist protection portion 14e may not be indispensable either.

Although there are provided the front low-extension member 15 and the side low-extension member 16 in the above first and second embodiments, the present invention is applicable to the seat without these low-extension members. Also, either one of these members 15, 16 may be applied. Also, both of the members 15, 16 need not to be disposed along the seat skin 12, and only one of them may be disposed along the seat skin. For example, in the case where the front low-extension member 15 is not disposed along the seat skin 12, one end of the front low-extension member 15 may be fixed to the tear portion 12e, the member 15 may be disposed so as to extend from the tear portion 12e, go through the opening portion 11g (slit) and the space portion 11f, and then extend laterally toward the center of the seat, passing before the side airbag unit 14, and the other end of the front low-extension member 15 may be fixed to the seat back frame 17. Meanwhile, in the case where the side low-extension member 16 is not disposed along the seat skin 12, one end of the side low-extension member 16 may be fixed to the tear portion 12e, the member 16 may be disposed so as to extend from the tear portion 12e, go through the opening portion 11g (slit) and the space portion 11f, and then extend rearward of the seat, passing on the outside of the side airbag unit 14, and the other end of the side low-extension member 16 may be fixed to the seat back frame 17.

Although the left-side portion 11b of the pad member 11 covers the front side, rear side, outside, upper side, and lower side of the side airbag unit 14 in the above first and second embodiments, part of the side airbag unit 14 may be covered with the pad member 11. For example, the outside of the side airbag unit 14 may not be covered with the pad member 11, but only with the seat skin 12.

Further, although the opening portion 11g of the pad member 11 is formed of the slit that is made by cutting part of the left-side portion 11b of the pad member 11 located before the airbag unit 14 from its seat inner face to its seat outer face in the first and second embodiments, the left-side portion 11b of the pad member 11 is configured so as to be torn by the inflation pressure of the airbag 14a. For example, the opening portion 11g may be formed of a weakness portion, such as slit, cut-away portion, that is provided at part of the left-side portion 11b of the pad member 11 from its seat inner face to its seat outer face.

Although the lower ends of the space portion 11f and the opening portion 11g (guide portion) are positioned substantially at the same level at the lower end of the lower space portion 11h in the embodiments, the lower end of the guide portion may be, for example, positioned substantially at the same as the lower end of the airbag 14a in the folded state. Thereby, the waist protection portion 14e is inflated into the lower space portion 11h, thereby tearing (breaking) easily the portion of the pad member 11 and the seat skin 12 that corresponds to the lower space portion 11h and inflating smoothly the airbag outside the seat back 10.

Also, although the airbag 14a comprise the waist protection portion 14e in the first and second embodiments, it is preferable that the lower space portion 11h be provided to improve the inflation of the lower portion of the airbag 14a even if the airbag 14a comprises no waist protection portion 14e.

Although the side airbag unit 14 of the first and second embodiments comprises the airbag 14a that is covered by the paper 14c, the airbag 14a may be stored in a case of the side airbag unit 14. The side airbag unit 14 with the airbag 14a covered by the paper 14 may preferably perform the advantages of the present invention.

The present invention should not be limited to the above-described embodiments, and any other modifications and improvements may be applied within the scope of a sprit of the present invention.

What is claimed is:
1. A seat with airbag unit for a vehicle, comprising:
a pad member forming a shape of a seat back;
a seat skin covering the pad member;
a bag member operative to inflate from a folded state thereof;
an airbag unit that is provided at a side portion of the seat back in such a manner that at least part thereof is covered by the pad member,
wherein said seat skin comprises a front face portion that is located on a front-face side of the side portion of the seat back including the airbag unit, a side face portion that is located on a side-face side of the side portion of the seat back including the airbag unit so as to be connected to the front face portion at the side portion of the seat back, and a tear portion operative to be torn by an inflation pressure of the bag member, which is provided at a portion of a connection portion between the front face portion and the side face portion of the seat skin and positioned substantially at a level of the airbag unit,
there is provided a guide space portion to direct the bag member toward the tear portion, which is formed at a portion of the pad member between the airbag unit and the tear portion substantially at a level corresponding to the airbag unit, a lower end of the guide space portion being located below a lower end of the folded bag member of the airbag unit, and a lower space portion is formed at the pad member that is located below the folded bag member of the airbag unit in such a manner that the lower space portion connects to a lower portion of said guide space portion, whereby a lower end part of the bag member can inflate outside through the lower space portion and the lower portion of the guide space portion.

2. The seat with airbag unit for a vehicle of claim 1, wherein there is provided a side low-extension member operative to promote tear of the tear portion, whose one end is fixed to the tear portion and which extends from the tear portion rearward on an outside of the airbag unit, the side low-extension member having a lower extension ratio than that of the seat skin and a lower end of the side low-extension member being positioned substantially at the same level as or below a lower end of the lower space portion of the pad member.

3. The seat with airbag unit for a vehicle of claim 2, wherein there is provided a front low-extension member, whose one end is fixed to the tear portion and which extends from the tear portion toward a center of the seat on a front side of the airbag unit, the front low-extension member having a lower extension ratio than that of the seat skin.

4. The seat with airbag unit for a vehicle of claim 3, wherein at least one of the side low-extension member and the front low-extension member is disposed along the seat skin.

5. The seat with airbag unit for a vehicle of claim 1, wherein the pad member comprises a portion covering outside of the airbag unit.

6. The seat with airbag unit for a vehicle of claim 1, wherein the bag member comprises a waist protection portion that corresponds to a waist portion of a passenger seated on a seat cushion, and the lower space portion is positioned substantially at the same level as the waist portion of the passenger at the seat back.

7. The seat with airbag unit for a vehicle of claim 1, wherein the bag member comprises a waist protection portion that corresponds to a waist portion of a passenger seated on a seat cushion, a chest protection portion connected to the waist protection portion that corresponds to a chest portion of the passenger, and a partition portion that partitions the waist protection portion from the chest protection portion, and the waist protection portion is configured so that an inflation of the waist protection portion is finished before an inflation of the chest protection portion.

8. The seat with airbag unit for a vehicle of claim 1, wherein the bag member is configured to inflate in such a manner that a lower face of the bag member contacts an upper face of a seat cushion.

9. The seat with airbag unit for a vehicle of claim 1, wherein there is provided a side support portion at the side portion of the seat back so as to project forward and extend vertically, a front end of the side support portion is formed in a curve shape in such a manner that a forward projection degree of a central portion thereof is greater than those of an upper portion thereof and a lower portion thereof, when viewed from the side, and the lower space portion is located near a portion where a distance between the front end of the side support portion and the rear end of the seat back frame has the greatest distance.

10. The seat with airbag unit for a vehicle of claim 1, wherein the bag member in the folded state in the airbag unit is covered by a paper operative to be broken by an inflation pressure of the bag member.

11. The seat with airbag unit for a vehicle of claim 1, wherein the lower space portion has a slant bottom which inclines forward and downward.

* * * * *